Dec. 27, 1955    H. C. RHODES    2,728,506
DOUGH PAN LOADING CONTROL
Filed July 1, 1953
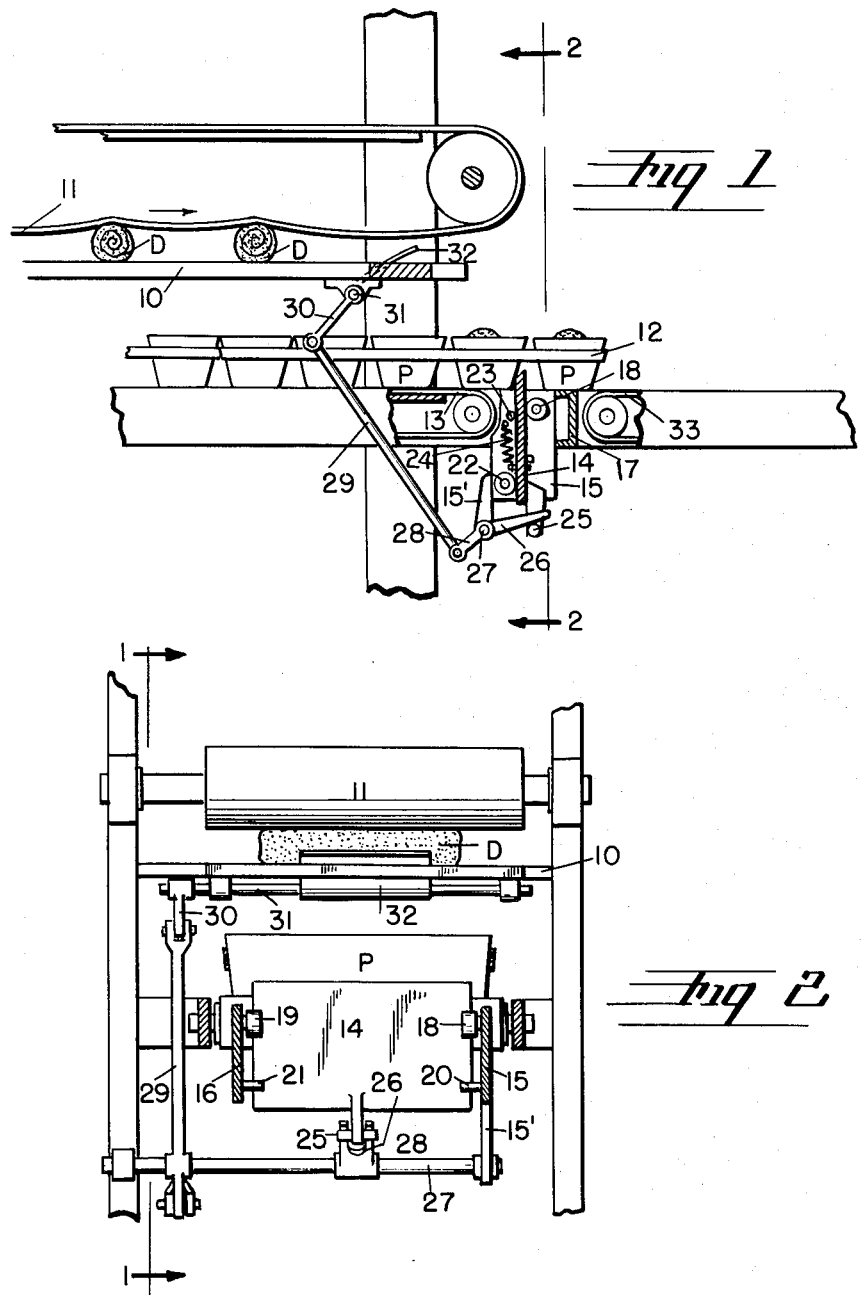
INVENTOR.
HERBERT C RHODES
BY
Otto Moeller
ATTORNEY

2,728,506

DOUGH PAN LOADING CONTROL

Herbert C. Rhodes, Portland, Oreg., assignor to Read Standard Corporation, a corporation of Delaware Application July 1, 1953, Serial No. 365,345

2 Claims. (Cl. 226—2)

This invention relates to the depositing of molded pieces of dough into baking pans for delivery to the baking ovens in the process of bread making.

In bakeries, where the mixing and molding of the dough is done on a large scale by machine, various means are employed for depositing the molded dough pieces consecutively into individual baking pans. The object of the present invention is to provide an improved, practical and simplified means for delivering molded pieces of dough into the baking pans and for automatically positioning the pans to receive the respective pieces of dough as molded.

In the attached sketches:

Fig. 1 is a side elevation taken on line 1—1 of Fig. 2 but with a portion broken away for clarity; and Fig. 2 is a transverse sectional elevation taken on line 2—2 of Fig. 1.

The individual pieces of dough D, received from the dough molding machine (not shown), are delivered on to a platform or table 10 beneath the lower portion of an endless traveling belt 11. The lower portion of this belt 11 rests in part on the pieces of dough, and, as it moves along (from left to right as viewed in Fig. 1), it causes the dough pieces to roll up and to be rolled along on the platform 10 in the same direction until they reach the discharging end of the platform 10. This contact of the belt with the dough pieces forms each dough piece into the molded shape desired for baking and maintains the dough piece in this shape until the dough piece passes out of contact with the endless traveling belt and is deposited in the baking pan.

The baking pans P, which are generally arranged in sets side by side within a frame 12, as illustrated in Fig. 1, are moved along on an endless traveling belt 13 beneath the platform 10 in the same direction as the dough pieces. It is necessary to halt the travel of the dough pans as they arrive beneath the discharging end of the platform 10 and to hold each pan in turn momentarily in position for receiving a piece of dough from the end of the platform 10 until the respective piece of dough has been dropped into the pan.

In order to hold each pan in position and prevent further travel of the pan until it has received its piece of dough, I provide a simplified mechanical control. This control includes a vertical stop plate 14 arranged transversely beyond the end of the path of the pan-conveying belt 13, and mounted for up and down reciprocal movement so that the stop plate 14 may be raised into pan-engaging position or lowered sufficiently to enable a pan to move past the stop plate.

The vertical stop plate 14 is positioned between a pair of side brackets 15 and 16, which in turn are secured to a transverse frame member 17 at the end of the frame in which the pan-conveying belt assembly is mounted. The stop plate 14 is movable vertically up and down in guideways formed by a pair of rollers 18 and 19, carried on a pair of transversely aligned stub shafts secured to the side brackets 15 and 16, and a pair of similarly aligned pins 20 and 21, which pins and rollers engage the forward face of the stop plate, and a similar but oppositely positioned pair of rollers (one of which is shown at 22 in Fig. 1) and a pair of pins (one of which is shown at 23 in Fig. 1) similarly engage the rear face of the stop plate 14. A pair of coil springs, one of which is shown at 24 in Fig. 1, having their bottom ends attached to the stop plate and their upper ends attached to the frame of the pan-conveying belt assembly, exert a constant upward pull on the stop plate. A foot member 25, extending from the bottom of the stop plate 14, is engaged by an arm 26 secured to a shaft 27, and this arm controls the upward travel of the stop plate under the pull of the springs 24.

The shaft 27 (Fig. 2) is supported at one end in a bearing mounted in an arm 15′ attached to the bracket 15, and at the other end the shaft 27 is mounted in a bearing attached to a frame support. The shaft 27 carries a second arm 28 which is rigidly secured to the shaft and this second arm 28 is connected by a link 29 to an arm 30 secured to a transverse shaft 31. The transverse shaft 31 is rotatably supported in a pair of bearings secured to the underside of the platform 10.

A portion of the platform 10 is cut out above the shaft 31 and a trip lever plate 32 is secured on the shaft 31 and is positioned in the cut out opening in the platform 10.

The arms 26 and 28, secured to the shaft 27, the arm 30 and the trip lever 32, secured to the shaft 31, and the connecting link 29, are so arranged that when the stop plate is in the raised pan-engaging position illustrated in the drawings, the trip lever 32 will slope obliquely upwardly and forwardly beyond the top face of the platform 10. However, when one of the dough pieces D engages the trip lever 32 the pressure of the upper belt 11 on the dough piece combined with the weight of the dough piece will cause the trip lever 32 to be depressed to the plane of the top face of the platform 10. This pressing down of the trip lever 32 will cause the stop plate 14 to be lowered against the force of the coil springs, and this lowering of the stop plate momentarily permits forward travel of the pans P. In this way an empty pan is moved into position beneath the discharging end of the platform 10 as each successive dough piece is moved over the trip lever 32.

Only a very little pressure is required to lower the stop plate 14 against the force of its springs and the two sets of guiding rollers for the stop plate 14 prevent any excessive friction being set up by the pressure of a pan against the top of the stop plate and thus the downward movement of the stop plate is in no way impeded.

A second conveyor belt 33 is preferably provided beyond the stop plate for moving the filled pans along on their course to the baking ovens.

I claim:

1. A control assembly for a dough panning machine of the type having conveying means for successively moving dough pieces to a point of discharge and a pan conveying means for moving pans into position subjacent the discharge point of said dough piece conveying means to receive dough pieces therefrom, said control assembly comprising a stop plate subjacent the point of discharge of dough pieces from said dough piece conveyor vertically movable between a first position in the path of movement of said pans and a second position below the path of movement thereof, spring means normally pendently supporting said stop plate in said first position to stop a pan to receive a dough piece, guide means constraining movement of said stop plate in a vertical path, a trip lever in the path of and adapted to be actuated by dough pieces as they are moved by said dough piece conveying means toward said point of discharge and linkage connecting said trip lever with said stop plate for moving said stop plate against the force of said spring to said second position upon actuation of said trip lever by a dough piece to permit advancement of a pan by said pan conveying means.

2. A control assembly for a dough panning machine of the type having conveying means for successively moving dough pieces to a point of discharge and a pan conveying means for moving pans into position subjacent the discharge point of said dough piece conveying means to receive dough pieces therefrom, said control assembly comprising a stop plate vertically movable between a first position in the path of movement of said pans and a second position below the path of movement thereof, spring means normally pendently supporting said stop plate in said first position to stop a pan to receive a dough piece, means including rollers adjacent opposite sides of said stop plate constraining movement thereof in said vertical path, a trip lever in the path of and adapted to be actuated by dough pieces as they are moved by said dough piece conveying means toward said point of discharge, and linkage connecting said trip lever with said stop plate for moving said stop plate against the force of said spring to said second position upon actuation of said trip lever by a dough piece to permit advancement of a pan by said pan conveying means.

References Cited in the file of this patent

UNITED STATES PATENTS 1,781,546  Harber _____ Nov. 11, 1930